(12) United States Patent
Vlahovic et al.

(10) Patent No.: US 8,336,958 B2
(45) Date of Patent: Dec. 25, 2012

(54) MOTOR VEHICLE

(75) Inventors: Josip Vlahovic, Freiberg Am Neckar (DE); Angelo Bronda, Weissach (DE); Grant Larson, Ludwigsburg (DE); Franziska Schumann, Stuttgart (DE); Shuichi Yamashita, Gerlingen (DE); Dominik Beierl, Korntal-Muenchingen (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 209 days.

(21) Appl. No.: 12/828,394

(22) Filed: Jul. 1, 2010

(65) Prior Publication Data

US 2011/0012417 A1 Jan. 20, 2011

(30) Foreign Application Priority Data

Jul. 17, 2009 (DE) .................. 10 2009 033 625

(51) Int. Cl.
*B60N 2/42* (2006.01)
(52) U.S. Cl. ............... 297/216.1; 297/216.13; 296/68.1; 280/751; 280/756
(58) Field of Classification Search ............... 297/216.1, 297/216.13, 216.14, 216.11; 296/68.1; 280/751, 280/756
See application file for complete search history.

(56) References Cited

U.S. PATENT DOCUMENTS

| | | | | |
|---|---|---|---|---|
| 3,810,656 | A | * | 5/1974 | Fox et al. .................. 280/751 X |
| 4,664,438 | A | * | 5/1987 | Crepaldi ...................... 296/68.1 |
| 5,468,045 | A | * | 11/1995 | Weber .................. 297/216.11 X |
| 5,779,271 | A | * | 7/1998 | Dorow et al. .................. 280/751 |
| 5,988,678 | A | * | 11/1999 | Nakamura et al. ............ 280/751 |
| 7,021,706 | B2 | * | 4/2006 | Aufrere et al. ........... 297/216.14 |
| 7,690,684 | B2 | | 4/2010 | Tobaru et al. |
| 2005/0212277 | A1 | | 9/2005 | Hamamoto et al. |
| 2007/0036946 | A1 | * | 2/2007 | Muller et al. ................. 280/751 |
| 2007/0052226 | A1 | | 3/2007 | Tobaru et al. |

FOREIGN PATENT DOCUMENTS

| | | |
|---|---|---|
| DE | 198 06 766 | 8/1999 |
| DE | 102 42 786 | 3/2004 |
| DE | 10 2006 042 036 | 4/2007 |

* cited by examiner

*Primary Examiner* — Anthony D Barfield
(74) *Attorney, Agent, or Firm* — Gerald E. Hespos; Michael J. Porco

(57) ABSTRACT

A motor vehicle has at least one vehicle seat (3) and a trim part (1) that extends in the vehicle transverse direction (FQ) behind the vehicle seat (3). A cross member (2) is arranged below and/or behind the trim part (1). The trim part (1) carries a protective element (11) on an end face (6) of the trim part (1) that faces the vehicle seat (3) to protect the trim part (1) from damage caused by contact with the vehicle seat (3).

15 Claims, 2 Drawing Sheets

MOTOR VEHICLE

CROSS-REFERENCE TO RELATED APPLICATIONS

This application claims priority under 35 USC 119 to German Patent Application No. 10 2009 033 625.7 filed on Jul. 17, 2009, the entire disclosure of which is incorporated herein by reference.

BACKGROUND OF THE INVENTION

1. Field of the Invention

The invention relates to a motor vehicle.

2. Description of the Related Art

US 2005/0212277 A1 relates to a motor vehicle with a seat that has a backrest. A cross member extends behind the vehicle seat in the vehicle transverse direction and carries roll bars. A trim part for the cross member is arranged under the trim part or is concealed by this.

The object of the invention is to optimize a motor vehicle.

SUMMARY OF THE INVENTION

The invention relates to a motor vehicle with a seat that has a backrest. A cross member extends behind the vehicle seat in the vehicle transverse direction and carries roll bars. A trim part for the cross member is arranged under the trim part and a protective element attached to an end face of a trim part to protect the trim part against damage caused by the vehicle seat when the seat is moved toward the trim part or the end face. This movement of the seat may occur if the driver adjust the seat. However, the backrest of the vehicle seat also may contact the trim part in an accident, and particularly in a rear collision. In this case, the protective element ensures that the trim part is protected against damage and also damps the impact of the vehicle seat on the trim part.

The protective element preferably is arranged on the end face of the trim part so that the backrest of a vehicle seat can contact the protective element. The protective element is advantageous for vehicle seats that have a seat rest adjustment. The protective element also is advantageous in the event of a rear collision because the backrest of the vehicle seat is likely to be moved in a rear collision.

The protective element preferably is a cushion. The cushion may be formed from foamed plastics, elastomeric materials or a PUR foam. The protective element or cushion preferably is a separate component that is fastened to the trim part. Thus, the trim part may be produced from a different plastic that is dimensionally stable. The trim part preferably possesses a visually attractive surface, such as a surface that may be painted the color of the vehicle.

The protective element preferably has fastening means for fastening the protective element to the trim part. The protective element and the fastening means may be produced in one piece. In particular, the fastening means may comprise one or more grip-behind elements that reach through the end face of the trim part and are secured on the rear side the trim part.

The trim part may be of one-part or multipart design. In both embodiments, the trim part comprises a middle portion and two lateral outer portions. In this case, the outer portions are assigned to vehicle seats and each such outer part preferably carries a protective element according to the invention. The middle portion and the two lateral outer portions of the multipart trim part preferably are formed form separate components that can be fastened to one another. Alternatively, the trim part could be formed from two parts each of which has an outer portion and a part of the middle portion.

The cross members preferably are used in convertible vehicles and the trim part is suitable for such motor vehicles. The laterally outer portions of the trim part preferably have linkage passage flaps that are held movably on the trim part so that the linkage passage flaps can be open or closed. Folding top linkage parts of the convertible folding top conventionally are located in the lateral vehicle region and lie in region of the outer portions of the trim part when the folding top is in the closed position. The outer portion of the trim part preferably has a linkage passage flap that opens the way for the folding top linkage. The linkage flap is closed When the folding top is in the open position.

The invention is explained in more detail below by means of an exemplary embodiment.

DETAILED DESCRIPTION OF THE PREFERRED EMBODIMENT

Figure 1:
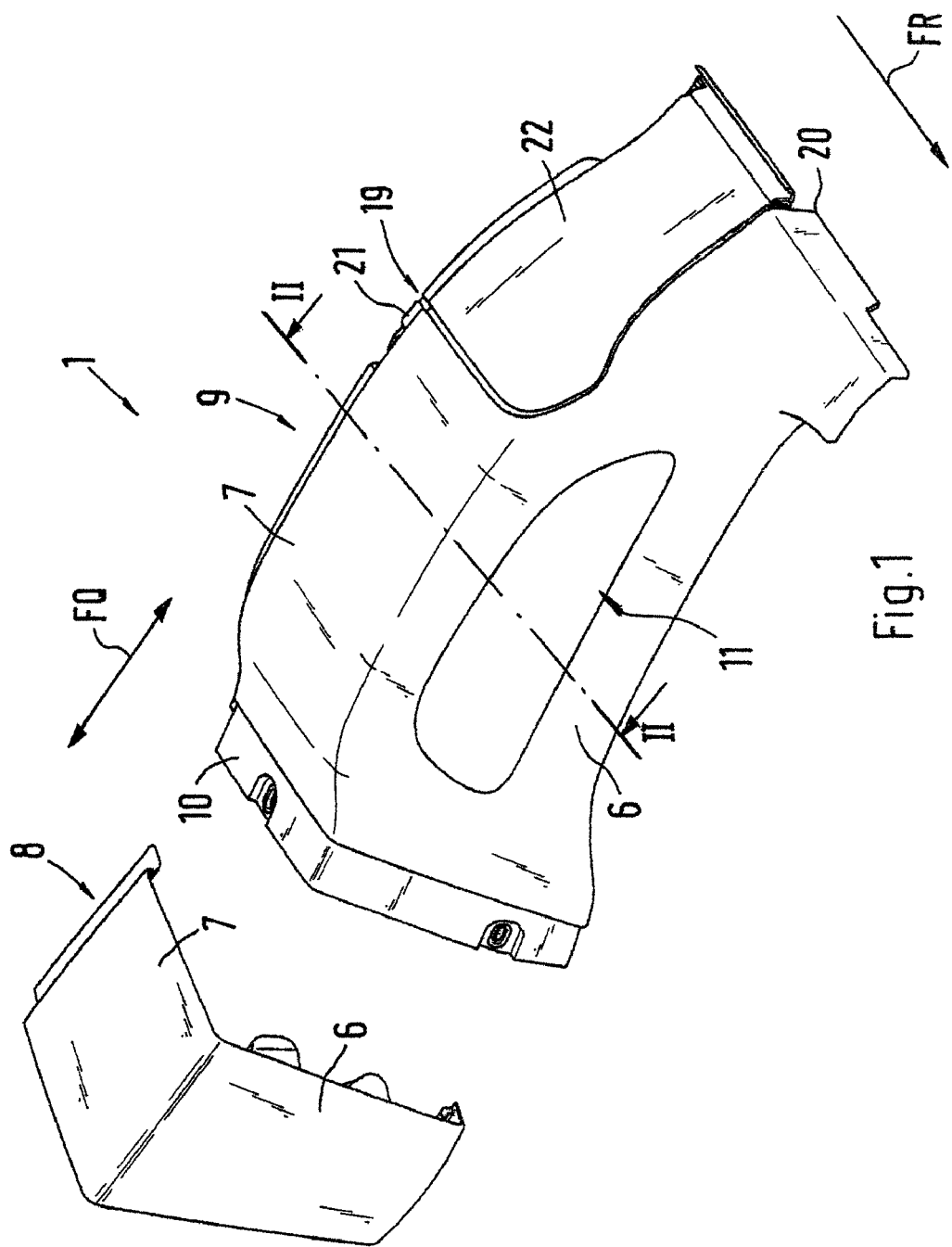
FIG. 1 shows a detail of a trim part in perspective.
Figure 2:
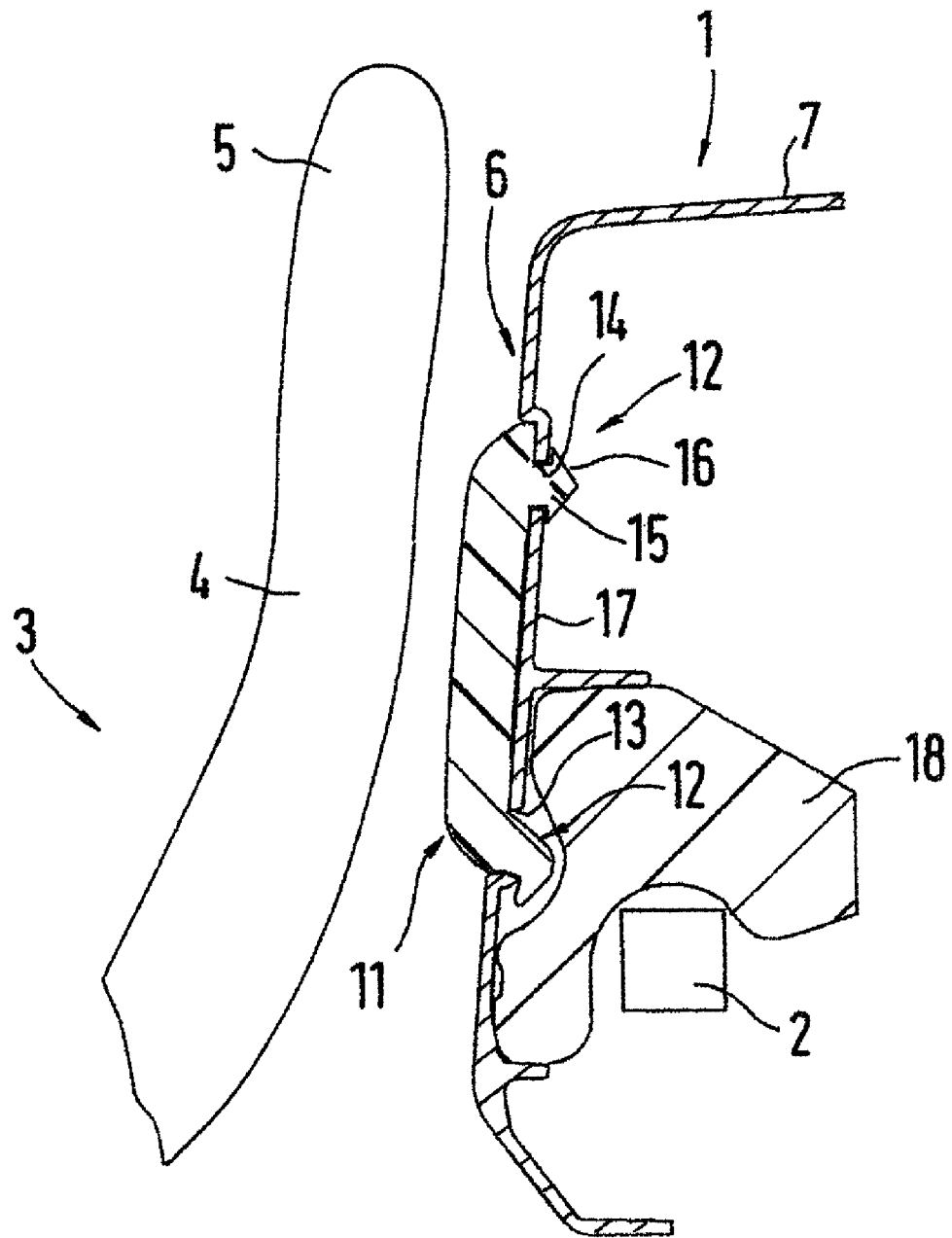
FIG. 2 shows a section through the trim part along the line II-II in FIG. 1.

A trim part in accordance with the invention is identified by the numeral 1 in FIGS. 1 and 2 and covers a cross member or transverse reinforcement 2 that lies beneath the trim part 1, as shown in FIG. 2. The trim part 1 and the transverse reinforcement 2 extend in the vehicle transverse direction FQ between two side walls (not shown) of the body of the motor vehicle. The trim part 1 and the cross member 2 extend approximately between door pillars (not shown) of the motor vehicle. The transverse reinforcement 2 may be tied to the door pillars or merely may be connected to the body of the motor vehicle in the region of the door pillars. Other fastening points may be provided, for example on a frame, such as a module carrier behind the transverse reinforcement 2.

The usual forward travel direction FR is identified by an arrow FR in FIGS. 1 and 2, and the tip of the arrow FR points in the direction of the vehicle front. A vehicle seat 3 is disposed in front of the trim part 1 and the cross member 2, as shown in FIG. 2. The seat 3 has a backrest 4 with a head restraint 5. The trim part 1 has an approximately L-shape in cross section, as shown in FIG. 2. However, the trim part 1 also be arranged above the cross member 2 and may be closed on all sides. Conversely, the trim part 1 may be in the form of an inverted U. In any event, the trim part 1 has an end wall 6 that faces the vehicle seat 3 in the travel direction FR. An upper region of the end wall 6 merges into a trim roof 7.

The trim part has a middle portion 8 and outer portions 9 that lie laterally on the outside of the motor vehicle. In this regard, FIG. 1 illustrates the outer portion 9 at the left vehicle side. The right side of the middle portion 8 adjoins another outer portion that is not illustrated, but which is a mirror image of the outer portion 9 illustrated in FIG. 1. Thus, the trim part 1 has two outer portions 9 at opposite left and right ends of the middle portion 8. The trim part 1 may be produced in one piece so that the middle portion 8 and the two outer portions 9 define a single part. However, the middle portion 8 and the two outer portions 9 preferably are formed from separate components that are joined together to produce a continuous trim part 1. Each outer portion 9 of the illustrated embodiment has a connecting surface 10 that faces the middle portion 8 and is covered by the middle portion 8 when the trim part 1 is mounted.

At least one protective element 11 is attached to the end face 6 of the trim part 1. The protective element 11 preferably is a sheet with an approximately oval contour, as shown in FIG. 1. Angular contours also could be provided. Alternatively, a strip-shaped protective element 11 could be arranged behind the respective vehicle seat 3 and could extend over the vehicle width. The protective element 11 projects beyond the end face 6 in the forward direction FR and thus forms a stop for the backrest 4 of the vehicle seat 3. The protective element 11 is a cushion and thus can protect the trim 1 against damage caused by the backrest 4 of the vehicle seat 3. The protective element 11 could be fastened to the end face 6 by adhesive bonding. However, a positive connection between the protective element 11 and trim part 1 is preferred. For this purpose, fastening means 12 preferably project from the rear surface of the protective element 11. The fastening means 12 reach through perforations 13, 14 on the end face 6 of the trim part 1 and are secured on the rear surface of the end face 6. The fastening means 12 are grip-behind elements and, as can be seen in FIG. 2, engage over the respective margin of the perforation 13 or 14. The lower fastening means 12 is hook-shaped and can be suspended in an approximately horizontal position when reaching through the lower perforation 13 in the trim part 1. The protective element 11 then can be swung up so that the upper fastening means 12 can reach through the upper perforation 14 and connect to the trim part 1. The upper fastening means 12 is a mushroom pin or the like with a shank 15 and a cap 16. The shank 15 has a diameter approximately equal to the inside diameter of the perforation 14. The cap 16 is larger than the shank 15 and can engage around the periphery of the upper perforation 14. Similarly, the hook-shaped lower fastening means 12 engages around at least part of the periphery of the lower perforation 13, as shown clearly in FIG. 2. The protective element and the fastening means 12 preferably define an integral or unitary structure, and may be formed, for example from a foamed plastic. Thus, the fastening means 12 can be elastic and can be tied in a simple way into the trim part 1 by reaching through the perforations 13 and 14.

A supporting element 18 is arranged between the cross member 2 and the inner or rear surface 17 of the end face 6 of the trim part 1, as shown in FIG. 2. Thus, the supporting element 18 helps to support the trim part 1 with respect to the cross member 2 and helps to hold the trim part 1 in position. A portion of the supporting element 18 is at a part of the inner surface 17 of the end face 6 behind the protective element 11 and between the lower fastening means 12 and the cross member 2.

A marginally open recess 19 is defined at the outer portion 9 of the trim part 1, as shown in FIG. 1. The marginally open recess 19 is open with respect to a side margin 20 of the trim part 1 facing the body side wall, and to a rear margin 21 of the trim part 1. A linkage passage flap 22 is disposed in the marginally open recess 19 and is held movably on the trim part 1 or on a vehicle part lying beneath the trim part 1. The linkage passage flap 22 can be moved out of the recess 19. Thus, the recess 19 can be opened for the passage of a folding top linkage of a folding top when the folding top assumes a closing position spanning the passenger space 23 shown in FIG. 2. When the folding top, not illustrated, is in the open position, the folding top linkage is moved out of the region of the recess 19, and the linkage passage flap 22 closes the recess 19 or linkage passage orifice. The linkage passage flap 22 thus is adjustable between a closing and an open position as a function of a position of the folding top, not shown.

As evident from FIG. 2, the protective element 11 is disposed to protect the trim part 1 against damage caused by the backrest 4 in the event of a movement of the vehicle seat 3 or the backrest 4 opposite to the travel direction FR. The protective element 11 is formed from an elastically deformable material. Thus, the trim part 1 is protected against damage even when the vehicle seat 3 or the backrest 4 presses with corresponding force against the protective element 11. Additionally, the spacer 18 supports the end face 6 of the trim part 1 with respect to the cross member 2 and hence further prevents damage to at least the end wall 6 of the trim part 1 in the event of the force by the vehicle seat 3 or its backrest 4 that could urge the trim part 1 toward the cross member 2.

What is claimed is:

1. A motor vehicle, comprising:
at least one vehicle seat having a rearward facing surface;
a trim part extending in a vehicle transverse direction and arranged behind the vehicle seat and having a forward facing surface rearward of the vehicle seat, the trim part having a middle portion and two lateral external outer portions attached to the middle portion;
a cross member arranged behind the trim part; and
at least one protective element formed from an elastically deformable material and carried on the forward facing surface of each of the lateral external outer portions of the trim part and facing the rearward facing surface of the vehicle seat, the at least one protective element being disposed and configured so that the rearward facing surface of the seat is closer to the protective element than to the trim part, whereby, the protective element protects the trim part from damage caused by contact with the seat.

2. The motor vehicle of claim 1, wherein the vehicle seat has a backrest, and wherein the protective element is arranged on the trim part in a position for protecting the trim part from contact with the backrest.

3. The motor vehicle of claim 1, wherein the protective element is a cushion.

4. The motor vehicle of claim 3, wherein the protective element is a separate component form the trim part and is fastened to the trim part.

5. The motor vehicle of claim 4, further comprising fasteners unitary with the protective element and configured for fastening the protective element to the trim part.

6. The motor vehicle of claim 1, wherein each outer portion has a linkage passage flap hingedly movable relative to the trim part.

7. A motor vehicle, comprising:
at least one vehicle seat having a rearward facing surface;
a cross member extending in a vehicle transverse direction and arranged behind the vehicle seat;
a trim part extending in the vehicle transverse direction and arranged between the vehicle seat and the cross member, the trim part having a forward facing surface rearward of the vehicle seat;
at least one elastically deformable protective element carried on the forward facing surface of the trim part facing the vehicle seat, the at least one protective element being disposed and configured so that the rearward facing surface of the seat is closer to the protective element than to the trim part; and
a spacer disposed between the cross member and a portion of the trim part on which the elastically deformable protective element is carried, whereby the protective element protects the trim part from damage caused by contact with the seat.

8. The motor vehicle of claim 7, wherein the vehicle seat has a backrest, the protective element aligns with the backrest.

9. The motor vehicle of claim 7, wherein the vehicle seat has a backrest and a headrest, the protective element aligns with at least one of the backrest and the headrest.

10. A motor vehicle, comprising:
at least one vehicle seat having a rearward facing surface;
a cross member extending in a vehicle transverse direction and arranged behind the vehicle seat;
a trim part extending in the vehicle transverse direction and arranged between the vehicle seat and the cross member, the trim part having a forward facing surface rearward of the vehicle seat; and
at least one elastically deformable protective element carried on the forward facing surface of the trim part facing the vehicle seat, the at least one protective element being disposed and configured so that the rearward facing surface of the seat is closer to the protective element than to the trim part, whereby the protective element protects the trim part from damage caused by contact with the seat, wherein the trim part has a plurality of perforations and the protective element has a plurality of fasteners unitary with the protective element and configured for fastening the protective element to the trim part at the respective perforations.

11. The motor vehicle of claim 10, further comprising a spacer disposed between the cross member and a portion of the trim part on which the elastically deformable protective element is carried.

12. The motor vehicle of claim 10, further comprising a spacer abutting a surface of the trim part opposite the vehicle seat at positions adjacent at least one of the fasteners, the spacer being between the cross member and a portion of the trim part on which the elastically deformable protective element is carried.

13. A motor vehicle, comprising:
at least one vehicle seat;
a cross member extending in a vehicle transverse direction and arranged behind the vehicle seat;
a trim part extending in the vehicle transverse direction and arranged between the vehicle seat and the cross member, lateral ends of the trim part being formed with linkage recesses, linkage passage flaps hingedly movable relative to the trim part; and
at least one elastically deformable protective element carried on a face of the trim part facing the vehicle seat.

14. The motor vehicle of claim 13, wherein the trim part has a middle portion and two lateral external outer portions attached to the middle portion, the linkage recesses being formed on the outer portions.

15. The motor vehicle of claim 14, wherein each outer portion has a protective element.

* * * * *